Dec. 25, 1962  F. A. CARLSON, JR., ETAL  3,070,475
LAMINATED STRUCTURES
Filed June 9, 1958
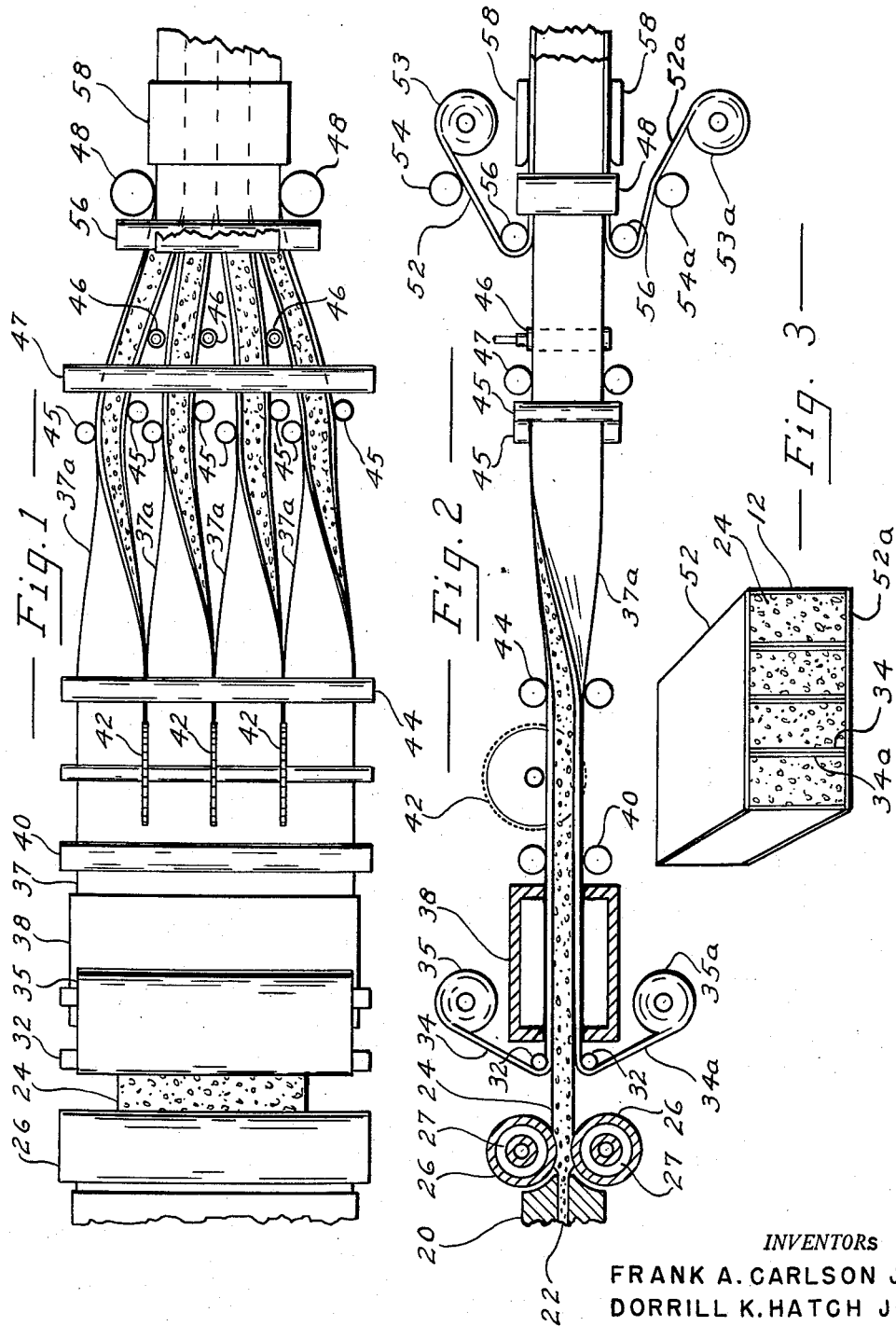
INVENTORS
FRANK A. CARLSON JR,
DORRILL K. HATCH JR.
ROBERT P. WHITTIER.
BY Richard L. Kelly ATTORNEY.

United States Patent Office 3,070,475
Patented Dec. 25, 1962

3,070,475
LAMINATED STRUCTURES
Frank A. Carlson, Jr., Springfield, Dorrill Kent Hatch, Jr., Longmeadow, and Robert P. Whittier, Wilbraham, Mass., assignors to Monsanto Chemical Company, St. Louis, Mo., a corporation of Delaware
Filed June 9, 1958, Ser. No. 740,712
3 Claims. (Cl. 154—45.9)

This invention relates to novel laminated structures and to a method for preparing same.

It is an object of this invention to provide rigid, mechanically strong, lightweight laminated structures suitable for use as load-bearing panels.

A further object of this invention is to provide an efficient and continuous method for preparing such laminated structures.

Other objects and advantages of the invention will be apparent from the following detailed description thereof when read in conjunction with the accompanying drawings in which:

FIG. 1 is a diagrammatic top-plan view with parts broken away of an apparatus for preparing such laminated structures;

FIG. 2 is a side elevation partially in section of the apparatus depicted in FIG. 1; and FIG. 3 is a perspective end view of a laminated structure prepared in the manner illustrated in FIGS. 1 and 2.

The laminated structures of the present invention consist of a pair of spaced-apart parallel facing sheets or skins which are laminated to a reinforced core of a lightweight foamed thermoplastic styrene polymer. The foamed thermoplastic styrene polymer core is reinforced by a plurality of substantially equidistant parallel sheets or ribs which run throughout the core and which are in perpendicular relationship to the facing sheets. As illustrated in FIG. 3, the facing sheets consist of paper sheets 52 and 52a. The reinforced foamed thermoplastic styrene polymer core is designated as 12 and consists of individual sections of foamed thermoplastic styrene polymer 24—24 which are joined to a series of substantially equidistant parallel reinforcing ribs. Each of the reinforcing ribs consists of a pair of paper sheets 34 and 34a which are cemented together to constitute a unitary structure.

Referring to FIGS. 1 and 2, a foamable styrene polymer composition, e.g., polystyrene containing 5–8% pentane, is delivered by an extruder (not shown) into an extruder die 20 in a fluid state above its melting point, but foaming within the extruder and the extruder die is supppressed by maintaining the plastic mass under pressure. When the plastic mass is extruded in sheet form through orifice 22, the sudden pressure drop (extruder pressure to atmospheric pressure) causes rapid foaming of sheet 24. Orifice 22 is positioned very close to the nip of rolls 26—26 and as a result sheet 24 contacts the rolls before it has completely foamed. In passing through the nip of the rolls, the surfaces of the sheet are cooled and the expansion of the resin forces the sheet into pressured engagement with the rolls thereby providing smooth, wrinkle-free surfaces on the sheet. The foam-contacting surfaces of rolls 26—26 are cooled by circulating cooling water through the liquid chambers 27—27 provided therein.

Sheet 24 is advanced and next passes through a pair of pressure-applying rolls 32—32. Sheets of paper 34 and 34a from rolls 35 and 35a are drawn over rolls 32—32 and are forced into pressured engagement with the top and bottom surfaces of sheet 24. Before making contact with sheet 24, the paper sheets 34 and 34a are heated above the melting point of the foamed styrene polymer by any suitable means not shown. The heating of the paper sheets assures that thin surface layers of the foamed styrene polymer sheet will be melted and forced into the interstices of the paper to form a strong bond between the polymer sheet and the paper sheets. The assembly of foamed styrene polymer sheet 24 and paper sheets 34 and 34a is designated as 37 and next passes through a steam chest 38 wherein the foamed styrene polymer sheet is further expanded and reduced in density.

Upon leaving steam chest 38, the assembly 37 is driven by drive rolls 40—40 through a plurality of vertical cutting saw blades 42—42 and cut into a series of narrower assemblies 37a—37a. For clarity of illustration only three saw blades are shown, but in actual practice a substantially larger number of blades will be employed. The flexible assemblies 37a—37a are advanced by drive rolls 44—44, twisted through an angle of 90° and supported in this up-ended position by a plurality of rotatable fingers 45—45, 46—46 and vertically positioned rolls 48—48. As the up-ended assemblies 37a—37a are advanced by drive rolls 47—47, adhesive is applied to one surface of each of the assemblies by fingers 46—46. The adhesive is supplied to the surfaces of the fingers by conventional means not shown. For example, the surfaces of the fingers may be perforated and a liquid adhesive chamber may be provided within the center of the fingers to deliver adhesive through the surface perforations. The inwardly directed pressure applied upon the up-ended assemblies 37a—37a by vertical rolls 48—48 causes the assemblies to adhere together to form a unified foamed styrene polymer sheet 12 which has a series of equidistant parallel reinforcing ribs running through the sheet. Paper sheets 52 and 52a are withdrawn from rolls 53 and 53a and an adhesive is applied to one surface thereof by rolls 54 and 54a. The adhesive-coated paper sheets 52 and 52a are drawn over pressure-applying rolls 56—56 and pressed against the top and bottom surfaces of the reinforced foamed styrene polymer sheet by platens 58—58. The finished laminated structure is then delivered to a cutting station not shown.

The following example is set forth to illustrate more clearly the principle and practice of this invention to those skilled in the art.

EXAMPLE I

A laminated structure is prepared employing an apparatus of the type illustrated in FIG. 1. The orifice 22 of extruder die 20 measures 8″ x 0.040″. The rolls 26—26 are 16″ long and 4″ in diameter and their surfaces are chrome-plated. The clearance between rolls 26—26 is 0.075″ and the distance between extruder die orifice 22 and the nip of rolls 26—26 is 0.25″.

A styrene homopolymer of about 60,000 average molecular weight which contains 7.0 weight percent of pentane as a foaming agent is extruded at a temperature of 295° F. and at a rate of 42 lbs. per hour. The rolls 26—26 are rotated at a speed of 9.5 revolutions per minute and their surface temperatures are maintained at 115° F. by circulating water throughout chambers 27—27. The foamed polystyrene sheet is delivered from rolls 26—26 at a rate of 8 ft. per minute.

Sheets 34 and 34a which are about 22″ wide and consist of 65 lb. kraft paper (having a thickness of about 0.006″) are heated to a temperature of 350° F. and drawn over rolls 32—32 at a rate of 8 ft. per minute. The foamed polystyrene sheet in assembly 37, as it leaves contact with rolls 32—32, is 12″ wide, 0.125″ thick and has a density of about 4 lbs./ft.³. The assembly is fed through steam oven 38 which is 6 ft. long and into which steam at 80 p.s.i. gauge is fed continuously. The foamed polystyrene sheet in assembly 37, as it is discharged from steam chest 38, is slightly more than 20″ wide, about 0.25″ thick and has a density of about 2 lb./ft.³.

The assembly 37 is trimmed to a 20″ width and passed through 9 vertical saw blades set 2″ apart so as to provide 10 narrower assemblies 37a—37a which are exactly 2" wide. A cold-setting phenol-resorcinol-formaldehyde adhesive is applied to one paper surface of each of assemblies 37a—37a at a rate of 0.35 lb. per 1,000 sq. in. Paper sheets 52 and 52a, which consist of 125 lb. kraft paper (having a thickness of about 0.013") are coated with a cold-setting phenol-resorcinol-formaldehyde adhesive at a rate of 0.70 lb. per 1,000 sq. in. and applied to the top and bottom surfaces of the reinforced foamed polystyrene sheet.

The laminates of this invention, because of their unique construction and the materials included therein, have low vapor transmission characteristics and high strength/weight ratios. In a preferred embodiment of the invention, the laminates vary in thickness from about 0.5" to about 4" and may be of virtually any length and width.

The facing sheets or skins of the laminates may be fabricated from paper, metal, plastic sheets fabricated from resins such as polystyrene, polyethylene, polyvinyl chloride, etc., glass fiber sheets impregnated with thermoset polyester resins, phenolic resins, etc., wood, paper impregnated with a thermoset melamine, urea or phenolic resin, textile fabrics, or similar materials The foamed styrene polymer included in the reinforced foamed styrene polymer core may be a thermoplastic styrene homopolymer or a thermoplastic interpolymer of styrene and an interpolymerizable vinylidene monomer. Such interpolymers should contain a predominant proportion of styrene, e.g., greater than 50 weight percent and preferably greater than 75 weight percent of styrene. Examples of vinylidene monomers which may be interpolymerized with the styrene include the conjugated 1,3-dienes, e.g., butadiene, isoprene, etc., alpha,beta-unsaturated monobasic acids and derivatives thereof, e.g., acrylic acid, methyl acrylate, ethyl acrylate, butyl acrylate, 2-ethylhexyl acrylate, the corresponding esters of methacrylic acid, acrylamide, acrylonitrile, methacrylonitrile, etc. If desired, blends of a major amount of the styrene polymer with a minor amount of another polymer may be employed, e.g., blends of the styrene polymer with rubbery diene polymers, or the analogous compositions obtained by polymerizing styrene monomer in the presence of a rubbery diene polymer. In any of the above type polymers, all or a portion of the styrene may be replaced with its closely related homologues such as alpha methylstyrene, o-, m- and p-methylstyrenes, o-, m- and p-ethylstyrenes, 2,4-dimethylstyrene, o-, m- and p-chlorostyrene, 2-methyl-4-chlorostyrene, etc. In general, the styrene polymers employed should have an average molecular weight in the range of about 40,000 to 100,000 (as determined by the Staudinger method). Such foamed styrene polymers should have a low density and especially preferred are those foamed polymers having a density of less than about 4 lbs./ft.$^3$. Foamed styrene polymers of a suitable density for use in the present invention can be purchased commercially in sheet form. However, to obtain such sheets in continuous lengths it is preferred to prepare the foamed sheets from foamable styrene polymer compositions by extrusion processes.

The reinforcing members provided in the foamed styrene polymer core may be fabricated from paper, wood, plastic sheets, metal, and in general materials of the same type employed in the facing sheets or skins. Such reinforcing members may consist of a single sheet of material or two or more sheets of material cemented together to form a unitary structure as illustrated in the drawings. In a preferred embodiment of the invention, the maximum thickness of the reinforcing sheets is about 0.030 inch and the total volume of said reinforcing sheets constitutes a maximum of about 5.0% of total volume of the foamed styrene polymer core.

The laminates of the invention have utility as partitions and load-bearing members in diverse engineering structures such as wall panels, roof panels, subflooring, etc. Engineering data for typical laminates of the invention in which both facing sheets or skins are 0.125" thick interior grade hardboard (untempered Masonite board) are set forth in Table I.

*Table I*

| Laminate Identification | A | B | C | D |
| --- | --- | --- | --- | --- |
| Reinforced Core Structure: | | | | |
| Core Thickness, inches | 2 | 2 | 2 | 1 |
| Reinforcing Sheet Material | Kraft Paper[3] | Kraft Paper[4] | Kraft Paper[4] | Kraft Paper[4] |
| Thickness of Reinforcing Sheet, inches | 0.013 | 0.026 | 0.026 | 0.026 |
| Distance Between Reinforcing Sheet, inches | 1.0 | 0.5 | 0.25 | 0.25 |
| Foam Density, lbs./ft.$^3$ | 1.1 | 1.6 | 3.9 | 3.9 |
| Engineering Properties: | | | | |
| Compressive Strength, lbs./in.$^2$ [1] | 26 | 135 | | |
| Flexural Strength, Ultimate Distributed Load, lbs./ft.$^2$ [2] | 550 | 840 | 1,060 | 475 |

[1] ASTM Procedure C-365-57 (Method B).
[2] ASTM Procedure C-393-57T.
[3] Basis weight, 125 lbs. ream.
[4] 2 sheets of 125 lb. kraft paper cemented together.

The above descriptions and particularly the examples are set forth by way of illustration only. Many other variations and modifications of the invention will be apparent to those skilled in the art and can be made without departing from the spirit and scope of the invention herein described.

What is claimed is:

1. A continuous process for preparing a rigid, mechanically strong, lightweight laminated structure which comprises the steps; (1) cutting a continuous assembly of a foamed styrene polymer sheet and a heat-bonded covering sheet into a plurality of narrower assemblies of substantially equal widths of from 0.5–4.0 inches, (2) turning each of said narrower assemblies through an angle of 90°, (3) pressing said narrower assemblies into touching relationship, (4) adhesively joining said narrower assemblies to form a sheet of a foamed styrene polymer that is reinforced with a plurality of substantially equidistant parallel reinforcing sheets which run throughout the length of the sheet, and (5) laminating covering sheets to the top and bottom surfaces of the reinforced foamed styrene polymer sheet.

2. A continuous process for preparing a rigid, mechanically strong, lightweight laminated structure which comprises the steps; (1) extruding a foamable styrene polymer composition into a continuous sheet of a foamed styrene polymer, (2) heat-bonding a continuous sheet of covering material to the continuous foamed styrene polymer sheet, (3) cutting the continuous assembly of the foamed styrene polymer sheet and the covering sheet into a plurality of narrower assemblies of substantially equal widths of from 0.5–4.0 inches, (4) turning each of said narrower assemblies through an angle of 90°, (5) pressing said narrower assemblies into touching relationship, (6) adhesively joining said narrower assemblies to form a sheet of a foamed styrene polymer that is reinforced with a plurality of substantially equidistant parallel reinforcing sheets which run throughout the length of the sheet, and (7) laminating covering sheets to the top and bottom surfaces of the reinforced foamed styrene polymer sheet.

3. A rigid, mechanically strong, lightweight laminated structure consisting of a pair of spaced-apart parallel facing sheets laminated to an 0.5–4.0 inch thick reinforced core of a foamed thermoplastic styrene polymer having a density of less than about 4 lbs./ft.$^3$, said foamed styrene polymer core being reinforced by a plurality of reinforcing means, said reinforcing means consisting of substantially equidistant, continuous parallel ribbons heat-bonded to the foamed styrene polymer core and which run directly across the length of the said foamed polymer core, each of said reinforcing ribbons lying in a plane perpendicular to the plane of the facing sheets, the maximum thickness of said reinforcing ribbons being about 0.030 inch, the total volume of said reinforcing ribbons constituting a maximum of about 5% of the total volume of the foamed styrene polymer structure.

References Cited in the file of this patent

UNITED STATES PATENTS

| | | |
|---|---|---|
| 2,373,500 | Pearce | Apr. 10, 1945 |
| 2,475,789 | Kunz | July 12, 1949 |
| 2,493,032 | Rheinfrank | Jan. 3, 1950 |
| 2,576,073 | Kropa et al. | Nov. 20, 1951 |
| 2,630,868 | Ellinberger | Mar. 10, 1953 |
| 2,770,406 | Lane | Nov. 13, 1956 |
| 2,839,442 | Whitaker | June 17, 1958 |
| 2,866,730 | Potchen et al. | Dec. 30, 1958 |

FOREIGN PATENTS

| | | |
|---|---|---|
| 559,527 | Great Britain | Feb. 23, 1944 |